United States Patent
Devendran et al.

(10) Patent No.: US 12,277,195 B2
(45) Date of Patent: Apr. 15, 2025

(54) INTELLIGENT LOCKING OF DISPLAY DEVICES FOR REMOTE USE

(71) Applicant: Kyndryl, Inc., New York, NY (US)

(72) Inventors: Saravanan Devendran, Bangalore (IN); Thangadurai Muthusamy, Bangalore (IN)

(73) Assignee: Kyndryl, Inc., New York, NY (US)

( * ) Notice: Subject to any disclaimer, the term of this patent is extended or adjusted under 35 U.S.C. 154(b) by 386 days.

(21) Appl. No.: 17/514,119

(22) Filed: Oct. 29, 2021

(65) Prior Publication Data
US 2023/0136643 A1    May 4, 2023

(51) Int. Cl.
G06K 9/00      (2022.01)
G06F 18/2431   (2023.01)
G06F 21/84     (2013.01)
G06T 7/70      (2017.01)
G09G 3/20      (2006.01)

(52) U.S. Cl.
CPC .......... *G06F 18/2431* (2023.01); *G06F 21/84* (2013.01); *G06T 7/70* (2017.01); *G09G 3/2096* (2013.01); *G06T 2207/20081* (2013.01); *G06T 2207/20084* (2013.01); *G09G 2358/00* (2013.01)

(58) Field of Classification Search
CPC .................................................... G06V 10/945
See application file for complete search history.

(56) References Cited

U.S. PATENT DOCUMENTS

| | | | |
|---|---|---|---|
| 8,396,265 B1* | 3/2013 | Ross | G06V 40/172 382/103 |
| 9,158,904 B1* | 10/2015 | Ross | G06F 21/32 |
| 2013/0084971 A1* | 4/2013 | Frady | G07F 17/3248 463/29 |
| 2013/0205410 A1 | 8/2013 | Sambamurthy et al. | |
| 2014/0025973 A1* | 1/2014 | Schillings | G06N 3/08 713/323 |
| 2014/0230018 A1* | 8/2014 | Anantharaman | H04L 12/2816 726/4 |
| 2014/0283059 A1* | 9/2014 | Sambamurthy | G06F 21/552 726/23 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Hadi Akhavannik
(74) *Attorney, Agent, or Firm* — Erik Swanson; Andrew M. Calderon; Calderon Safran & Wright P.C.

(57) ABSTRACT

A method, computer program product, and system include a processor(s) that continuously obtains data from the one or more sensor devices, generating, from the data, frames comprising images, identifies, utilizing the frames, entities within a pre-defined vicinity of a visual display unit at a first time, determines, based on applying the classification model, if each identified entity of the identified entities within the pre-defined vicinity at the first time is objectionable. When the processor(s) determined that at least one identified entity is objectionable, the processor(s) initiates a security action on the visual display unit to prevents the objectionable identified entity from viewing the content on the visual display unit.

20 Claims, 6 Drawing Sheets

(56) References Cited

U.S. PATENT DOCUMENTS

| | | | |
|---|---|---|---|
| 2014/0307929 A1* | 10/2014 | Nechyba | G06V 40/171 |
| | | | 382/118 |
| 2015/0193611 A1* | 7/2015 | Zhao | H04W 12/065 |
| | | | 726/19 |
| 2015/0378433 A1* | 12/2015 | Savastinuk | G06F 3/015 |
| | | | 345/156 |
| 2016/0379205 A1* | 12/2016 | Margadoudakis | H04W 4/80 |
| | | | 705/71 |
| 2017/0068322 A1* | 3/2017 | Steinberg | G06F 3/0304 |
| 2017/0076077 A1* | 3/2017 | Zhao | G06F 21/32 |
| 2017/0329943 A1 | 11/2017 | Choi et al. | |
| 2018/0005283 A1* | 1/2018 | Lawson | H04L 43/50 |
| 2018/0211024 A1* | 7/2018 | Zhao | G06F 21/32 |
| 2019/0258251 A1* | 8/2019 | Ditty | B60W 50/023 |
| 2019/0384941 A1 | 12/2019 | Anderson et al. | |
| 2020/0151345 A1 | 5/2020 | Chauhan | |
| 2021/0295627 A1* | 9/2021 | Miller | G06Q 20/208 |

* cited by examiner

INTELLIGENT LOCKING OF DISPLAY DEVICES FOR REMOTE USE

BACKGROUND

Working remotely is becoming more prevalent and employers have worked to institute security measures that enable employees to work remotely while guarding the security of the company's data such that it is not compromised based on being accessed and viewed at various remote locations rather than exclusively in a premises under the control of the employer. One security challenge for an employer is ensuring that data viewed at remote locations cannot be captured by individuals without clearance to access the data based on the display of these data. For example, when data is displayed by an authorized user on a display of a computing device utilized by that user, the data can become susceptible to viewing and usage by unauthorized users who are able to view the display. Screen captures and other images of the display device displaying the data can be taken and the usage of these images by unauthorized users can compromise security and data integrity.

SUMMARY

Shortcomings of the prior art are overcome, and additional advantages are provided through the provision of a method for protecting displayed data from unauthorized viewings. The method includes, for instance: continuously obtaining, by one or more processors, data from one or more sensor devices, wherein the one or more sensor devices monitor a pre-defined vicinity proximate to a visual display unit, wherein the visual display unit is utilized by a computing device to display content; generating, by the one or more processors, from the data, frames comprising images; identifying, by the one or more processors, based on applying a classification model to the frames obtained at a first time, entities within the pre-defined vicinity at the first time, wherein the identifying comprises tagging entities with identifiers and tagging positioning of the entities within the pre-defined vicinity at the first time; determining, by the one or more processors, based on applying the classification model to the identified entities, based on the tagging, if each identified entity of the identified entities within the pre-defined vicinity at the first time is objectionable; and based on determining that at least one identified entity is objectionable, initiating, by the one or more processors, a security action on the visual display unit, wherein the security action prevents the objectionable identified entity from viewing the content on the visual display unit.

Shortcomings of the prior art are overcome, and additional advantages are provided through the provision of a computer program product for protecting displayed data from unauthorized viewings. The computer program product comprises a storage medium readable by a one or more processors and storing instructions for execution by the one or more processors for performing a method. The method includes, for instance: continuously obtaining, by the one or more processors, data from one or more sensor devices, wherein the one or more sensor devices monitor a pre-defined vicinity proximate to a visual display unit, wherein the visual display unit is utilized by a computing device to display content; generating, by the one or more processors, from the data, frames comprising images; identifying, by the one or more processors, based on applying a classification model to the frames obtained at a first time, entities within the pre-defined vicinity at the first time, wherein the identifying comprises tagging entities with identifiers and tagging positioning of the entities within the pre-defined vicinity at the first time; determining, by the one or more processors, based on applying the classification model to the identified entities, based on the tagging, if each identified entity of the identified entities within the pre-defined vicinity at the first time is objectionable; and based on determining that at least one identified entity is objectionable, initiating, by the one or more processors, a security action on the visual display unit, wherein the security action prevents the objectionable identified entity from viewing the content on the visual display unit.

Shortcomings of the prior art are overcome, and additional advantages are provided through the provision of a system for protecting displayed data from unauthorized viewings. The system includes: one or more sensor devices communicatively coupled to a dedicated hardware unit; a visual display unit utilized by a computing device, the computing device communicatively coupled to the dedicated hardware unit; and the dedicated hardware unit comprising: a memory, one or more processors in communication with the memory, and program instructions executable by the one or more processors via the memory to perform a method. The method includes, for instance: continuously obtaining, by the one or more processors, data from one or more sensor devices, wherein the one or more sensor devices monitor a pre-defined vicinity proximate to a visual display unit, wherein the visual display unit is utilized by a computing device to display content; generating, by the one or more processors, from the data, frames comprising images; identifying, by the one or more processors, based on applying a classification model to the frames obtained at a first time, entities within the pre-defined vicinity at the first time, wherein the identifying comprises tagging entities with identifiers and tagging positioning of the entities within the pre-defined vicinity at the first time; determining, by the one or more processors, based on applying the classification model to the identified entities, based on the tagging, if each identified entity of the identified entities within the pre-defined vicinity at the first time is objectionable; and based on determining that at least one identified entity is objectionable, initiating, by the one or more processors, a security action on the visual display unit, wherein the security action prevents the objectionable identified entity from viewing the content on the visual display unit.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
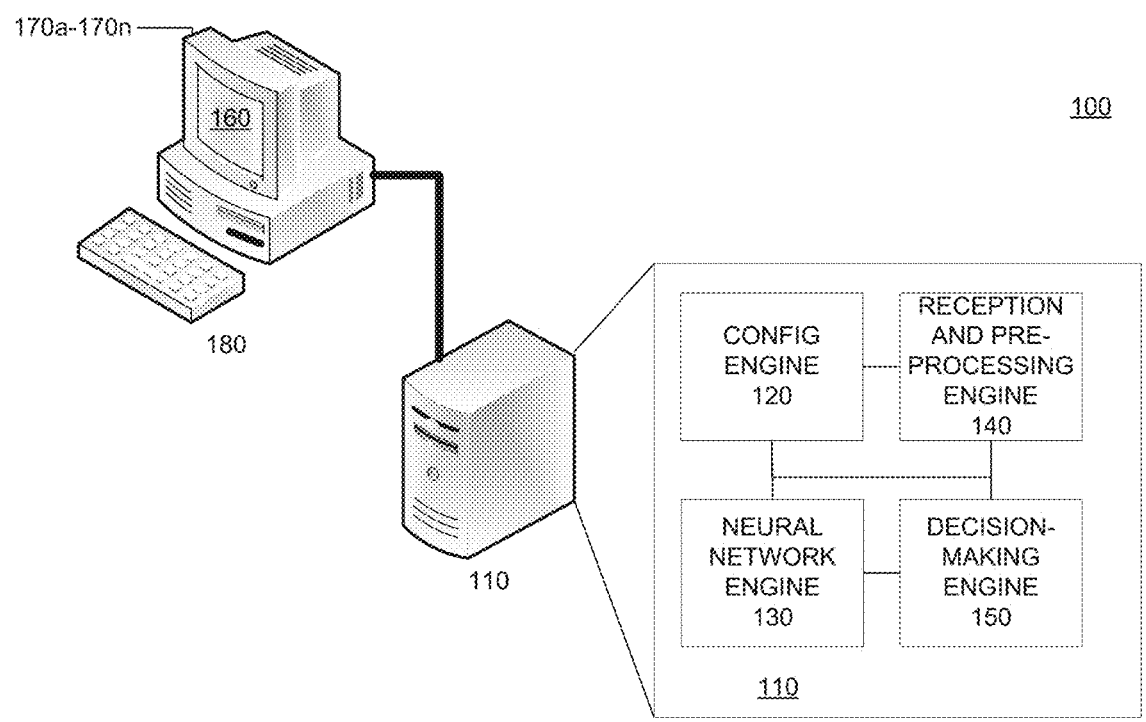
FIG. 1 depicts a technical environment into which aspects of some embodiments of the present invention have been implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
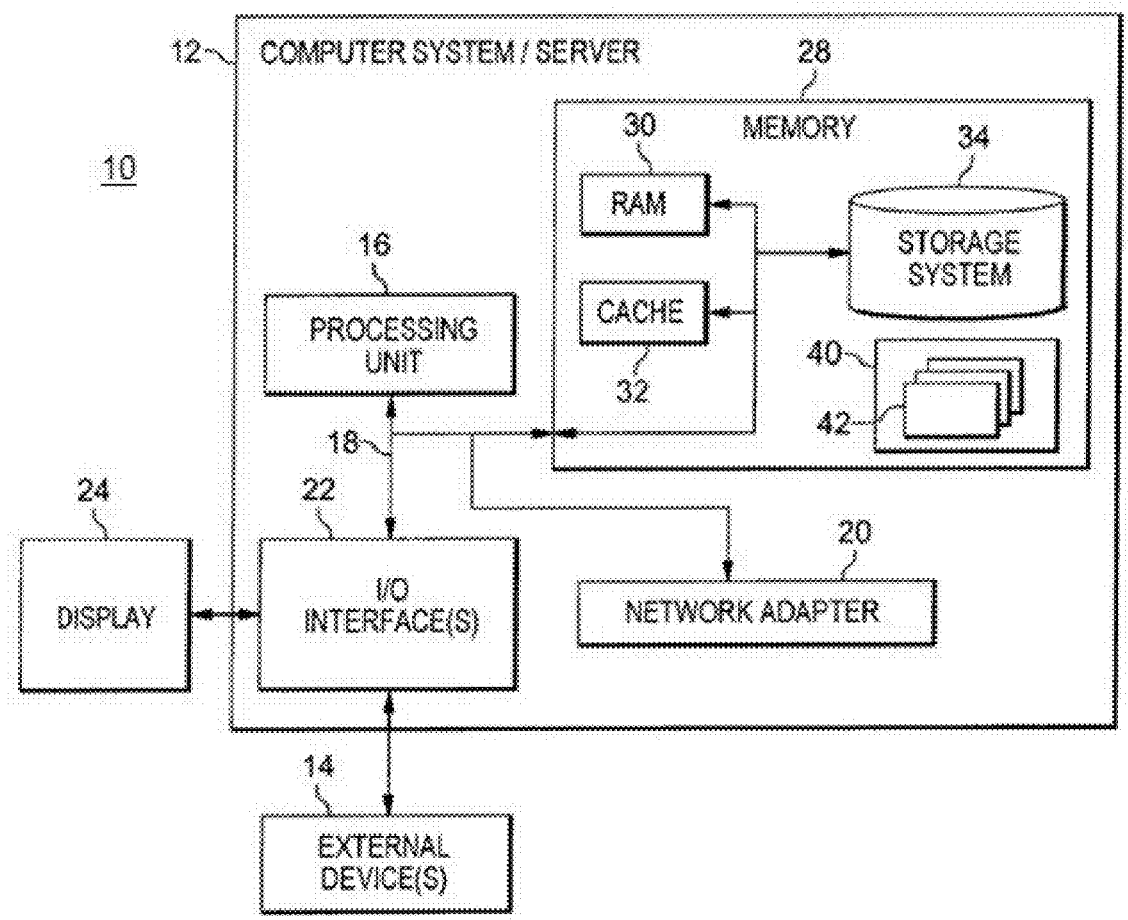
FIG. 4 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

When an employer can control the premises in which an employee works, the employer can implement various security measures that prevent the unauthorized porting of data to locations outside of the premises. Due to public health concerns as well as the growing prevalence of remote work arrangements as a standard industry practice in many industries, employers have had to think creatively about protecting their resources when they do not have control of the premises in which the resources are utilized. One challenge to controlling proprietary or otherwise confidential data is that when employees at remote locations view the data on a display of a computing device, the view of the data from this perspective can be captured. For example, the employee can take a screenshot. Also, an individual with a view of the display can utilize an image capture device to capture an image of the display. Thus, displaying data in the course of working remotely can pose a risk to data security. Although there are certain existing approaches to mitigating this risk, these approaches have certain implementation and security issues. For example, one existing approach to mitigate screen views and captures by unauthorized users is to provide an extra protective layer over the display that blocks the ability to view the data displayed on the screen/display from certain angles. However, an individual at an unblocked angle, such as standing or sitting directly behind the employee, would still be able to view and therefore, visually capture, anything visible on the display. Another approach which mitigates data capture using the device itself, which is also displaying the data, is installing software that restricts screen captures as well as access to the data by external drives. However, image capture and other recording devices external to the machine that is displaying the data can still be utilized to record and capture what is displayed. As will be discussed in greater detail below, methods, computer program code, and systems described herein secure displayed data in a manner that addresses the shortcomings of these existing approaches by preventing displayed data from being recorded or otherwise captured by external devices, including but not limited to, external cameras and other recording devices. Hence, examples described herein provide significantly more than existing approaches as examples of the disclosed invention include an intelligent monitoring system.

Embodiments of the present invention include computer-implemented method, computer program products, and systems that include a configurable hardware unit that detects prohibited objects and/or postures/actions of one or more users within a defined vicinity of data being displayed on a display and triggers a security action to secure the data upon detection. This monitoring hardware has a fast response time and in some examples, can detect objects and/or postures/actions in close to fractions of a second. In some embodiments of the present invention, the program code determines that the prohibited objects and/or postures/actions of one or more users are no longer within the defined vicinity of data and reverses and/or halts the security action, allowing regular operation of the display to resume. To that end, the hardware unit and program code executing on one or more processors that control the dedicated hardware unit, monitor an environment proximate to a user who is utilizing a computing device with a display (also referred to herein as a screen or a monitor) to view the data. In examples herein, the hardware unit continuously monitors the environment while the user in engaged with the data. In some examples herein, the hardware unit includes or controls and/or obtains data from one or more image capture device. Program code executing on the hardware unit and/or one or more processors communicatively coupled to the hardware unit, obtains the images captured and can identify the user and unauthorized objects or individuals (e.g., unauthorized users, image capture devices) within the (monitored) vicinity of the user. Upon detection of the presence of the unauthorized objects and/or individuals, the program code takes an action to secure the data to prevent recording, viewing, and possible dissemination of the data.

In certain examples herein, program code executing on the hardware unit and/or remotely controlling aspects of the hardware unit, is continuously trained, utilizing training data and one or more machine learning algorithms, to recognize authorized users and unauthorized objects or individuals within the monitored vicinity, and to distinguish authorized users from unauthorized objects or individuals. Thus, the program code that detects the presence of authorized users and unauthorized objects or individuals within the monitored vicinity is tuned and improved while it is being utilized.

In some examples herein, the hardware unit is configured to utilize various sensors, including built-in sensors and sensors communicatively coupled to the hardware unit (e.g., InDepth cameras, light detecting and ranging (Lidar) sensors, infrared (IR) sensors, etc.), not only to detect unauthorized objects or individuals, but also to detect when an authorized individual is engaged in a suspicious activity, based on movement and/or a posture or position of the authorized individual. Should the program code (executing on or of the hardware unit and/or on one or more processors communicatively coupled to the hardware unit), based on the sensor data transmitted to the hardware unit, determine that an authorized user is moving is a suspicious manner (e.g., such as that to suggest the user is utilizing an external image capture device), the program code can implement an automatic security measure at the display. In examples herein, automatic security measures implemented by the program code responsive to detecting various types of security concerns can vary. The security measures can be configurable and can be implemented by the program code in accordance with rules. Security concerns can include, but are not limited to, detecting unauthorized objects and/or individuals, detecting authorized individuals engaged in suspicious activities (e.g., in certain postures), detecting a number of people exceeding a threshold number of people in the monitored vicinity. The automatic security measures can include but are not limited to, turning off the monitor, blurring the data displayed on the screen, locking the screen, and/or providing a warning message, such as a pop-up message, on the screen.

Embodiments of the present invention are inextricably linked to computing and are directed to a practical application. Unauthorized access to viewed data in a computing environment is an issue unique to computing, specifically to remote computing. The approaches described herein identify security issues through the utilization of a computing infrastructure, including a dedicated hardware unit, various sensors and/or peripheral devices, and/or program code executing on one or more processors to enable the hardware infrastructure to communicate and implement security measures. Additionally, the solutions to perceived security issues, are also inextricably tied to computing as they include turning off the monitor, blurring the data displayed on the screen, locking the screen, and/or providing a warning message, such as a pop-up message, on the screen. The computing infrastructure described herein enables timely automatic discovery and automatic mitigation of possible data security issues. Additionally, timely automatic discovery and automatic mitigation of possible data security issues is a practical application.

FIG. 1 depicts various aspects of a technical architecture 100 of some examples of the present invention. For illustrative purposes, various functionalities implemented by the software and/or the hardware in the technical architecture 100 are depicted as distinct modules. However, various modules or processing device can be utilized to implement one or more of these functionalities. Dividing certain of these aspects into modules is therefore done to show an example of a possible configuration and to illustrate these functionalities in a delineated manner for ease of comprehension.

The technical environment of FIG. 1 includes a hardware unit 110, which can be understood to be a smart environment hardware monitoring unit. The hardware unit 110 is comprised of different modules which enable the smart monitoring of the technical architecture 100, which includes the physical vicinity of the hardware unit 110. The modules include a configuration engine 120, a neural net engine 130, a data reception and preprocessing engine 140, and a decision-making engine 150. Each of these modules is described below. Within the vicinity in the technical environment 100 monitored by the hardware unit 110, are one or more visual displays 160, which a user is utilizing to display data which the hardware unit 110 serves to secure.

The hardware unit 110 includes a data reception and preprocessing engine 140. Program code of the data reception and preprocessing engine 140 executing on one or more processors, including but not limited to the processing resources of the hardware unit 110, received sensor data from devices embedded in the hardware unit 110 and in the technical environment 100 which monitor a given vicinity. The vicinity being monitored is a distance surrounding the one or more visual displays 160 from which data displayed on the one or more visual displays 160 can be viewed and/or captured (via screenshot, image capture by another device, etc.) by an individual. The technical environment 100 can include various sensor devices 170a-170n positioned at various locations to monitor the vicinity and/or embedded in the hardware unit 110 and/or the computing device or devices 180 (i.e., parent devices) controlling the one or more visual displays 160. The various sensor devices 170a-170n can include, but are not limited to, various digital cameras, Lidar devices, and true depth cameras. These inbuilt device sensors (e.g., InDepth cameras, Lidar sensors, IR sensors) send data to the data reception and preprocessing engine 140 of the hardware unit 110 in addition to sending data to other software in the technical environment 100. The reason for the variety of devices is that the data captured, once processed by the program code of the data reception and preprocessing engine 140, provides images of entities within the vicinity as well as the distance of those entities from the one or more visual displays 160 (displaying data). The program code of the data reception and preprocessing engine 140 obtains sensor data from the various sensor devices 170a-170n and converts the sensor data into images with image dimension data. In some examples, the program code segments the images generated from the senor data into multiple images with associated distances. Thus, the metadata the program code generates and associates with each image indicates the distances of the entities captured in the images from the one or more visual displays 160 in the technical environment 100. The images and metadata generated by the program code of the data reception and preprocessing engine 140 is then processed by the neural network engine 130 of the hardware unit 110.

Referring to FIG. 1, the hardware unit 110 also includes the neural network engine 130. Program code in this module utilizes a neural network to process and classify images from the data reception and preprocessing engine 140. As will be discussed in below, the program code of the hardware unit 110 is trained with a machine learning model (generated and updated in this example in the neural network engine 130), to detect prohibited objects and postures of users. By applying the machine learning model, the program code utilizes segment detection to detect segment of objects with the images from the data reception and preprocessing engine 140 and identifies the objects. The program code of the neural network engine 130 also detects people within a pre-defined vicinity of the one or more visual displays 160 and determines whether each person is entitled to access the data displayed on the one or more visual displays 160 (e.g., is an authorized user of the device or devices 180 controlling the one or more visual displays 160).

As understood by one of skill in the art, neural networks are a biologically inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing (NLP). As described below, the neural network engine 130 in embodiments of the present invention is utilized for its image recognition capabilities.

In embodiments of the present invention, program code comprising the neural network engine 130 is utilized to recognize and distinguish people, objects, and movements, within a monitored vicinity of one or more visual displays 160 in the technical environment 100. To this end, image recognition capabilities, are implemented as a machine learning system that includes a neural network (NN). In certain embodiments of the present invention the program code utilizes supervised, semi-supervised, or unsupervised deep learning through a single- or multi-layer NN to identify objects, individuals, and postures/activities, in images from the data reception and preprocessing engine 140. The program code can utilize resources of the NN to identify and weight connections and train machine learning algorithms to identify individuals, objects, and postures/movements. Training data including images of authorized individuals (non-objectionable individuals) and postures/movements which are not objectionable can be utilized to train the machine learning algorithms and to generate a classifier or model to utilize to classify entities and movement/postures as objectionable or not objectionable. The program code of the neural network engine 130 continues to train and re-train the algorithms, which can update the model, over time, based on the images obtained from the data reception and preprocessing engine 140. Thus, the NN can identify certain key features of objects and individuals captured in the images from the data reception and preprocessing engine 140 to identify whether the individuals within the monitored vicinity, as captured in the generated images, are authorized personnel and/or if they are engaged in authorized activities. Thus, by utilizing an NN, the program code can identify the individuals, objects, and postures/movements, and classify these individuals, objects, and postures/movements as authorized or unauthorized.

In some embodiments of the present invention, the neural net engine 130 is utilized for two distinct aspects. In one aspect, program code utilizes a neural network to recognize individuals and objects in images transmitted to the neural net engine 130 by the data reception and preprocessing engine 140. The program code tags the recognized/identified entities with identifying labels and, in some examples, based on the metadata, indicators of a distance between the identified entities and the one or more visual displays 160 in the technical environment 100. In a second aspect, the program code utilizes a neural network to tag the individuals identified previously as objectionable or non-objectionable in the images and identifies postures and/or movements of individuals as objectionable or non-objectionable. As aforementioned, the program code of the neural net engine 130 can apply machine learning algorithms to generate and update a model that the program code applies to classify identified individuals and postures/movements as objectionable or not objectionable. In order to classify the identified individuals and postures/movements as such, the program code can utilize as training data, data from various knowledge bases, including but not limited to, a list of authorized personnel that includes images and/or a knowledge base that correlates poses and/or movements with actions such that upon identifying a given posture or movement in a captured image (e.g., video and/or still frame), the program code can identify an activity associated with the posture and/or movement and based on identifying the activity, the program code of the neural network engine 130 can determine if the particular activity is objectionable. For example, the program code of the neural network engine 130 can determine that an individual stretching after sitting in front of the one or more visual displays 160, which is not an objectionable activity, but that the same individual (previously identified by the neural network engine 130), is engaging in objectionable behavior when the individual begins using a personal device to capture images (e.g., take selfies) proximate to the one or more visual displays 160.

After the program code of the neural net engine 130 identifies entities and postures/movements in the images processed by the data reception and preprocessing engine 140 and classifies elements as objectionable and non-objectionable, it is at the decision-making engine 150 that program code determines whether a security action should be taken and implements this action. In some examples, the program code of the neural net engine 130 detects and identifies (from the images) object names, number of people within a pre-defined vicinity of the one or more visual displays 160 other than the authorized user, and/or a prohibited posture. Based on this information, the program code of the decision-making engine 150 applies or does not apply configured rules.

In some embodiments of the present invention, the program code of the decision-making engine 150 obtains the classifications by the neural network engine 130 utilizing the machine-learning-generated model, of entities and postures/movements identified as objectionable and/or non-objectionable. The program code of the decision-making engine 150 references policies from the configuration engine 120 (which will be discussed in greater detail below), and based on the policies, the program code issues control commands to the computing device or devices 180 controlling the one or more visual displays 160. Commands issued by the decision-making engine 150 to the computing device or devices 180 controlling the one or more visual displays 160 can include, but are not limited to, command to: 1) turn off the display (monitor); 2) lock the screen; 3) log audit information and push this information to a designated location on the network; 4) obscure the image on the screen (also referred to as blanking out the screen); and/or 5) obscure the screen with a pop-up warning message. Logging the audit information refers to the program code of the hardware unit 110 retaining records, including but not limited to snapshots of images that triggered an action, such as those listed, so that these records can be audited for future purposes, including improvement of the model via self-learning.

Embodiments of the present invention are configurable and for this reason, the example illustrated in FIG. 1 includes a configuration engine 120. The configuration engine can be configured, including by an administrative user, to specify rules of action, including but not limited to actions to be taken upon detection of prohibited objects, action to be taken upon detection of users other than the authorized user, and/or upon detection of prohibited postures by an authorized user. Thus, the configuration engine 120 provides controls and otherwise communicates with the various modules of the hardware unit 110, including the neural net engine 130, the data reception and preprocessing engine 140, and the decision-making engine 150. Various programmatical elements are loaded into the configuration engine 120 and determine certain functionalities of the hardware unit 110. Via the configuration engine 120, a user (e.g., an administrator) can interact with various control elements and can modify them (e.g., via a graphical user interface). Changes implemented in this configuration engine 120 impact the functionality of various aspects of the hardware unit 110, which in this example are separated into various modules, for ease of understanding. Elements loaded into the configuration engine 120 which control the functionality of the hardware unit 110 include: 1) the model generated in and applied by the neural network engine 130; 2) control policies that enable the program code of the decision-making engine 150 to control the computing device or devices 180 (i.e., parent devices) controlling the one or more visual displays 160; 3) audit log policies as one of the security actions triggered by the decision-making engine 150 is retaining, in a log, snapshots of images that triggered an action by the decision-making engine 150; and 4) new firmware images (binaries that contain the complete software of devices in the technical environment, including the computing device or devices 180 (i.e., parent devices) controlling the one or more visual displays 160).

The configurable aspects of embodiments of the hardware unit 110 enables examples of the disclosed examples to be utilized in various environments. For example, an educational institution could configure the hardware unit 110 to send an alert to a student device when the student is sleeping or not focusing on the online class/experience being displayed on the device.

In addition to initially determining that an objectionable object (entity, movement, posture, number of people) is within a monitored vicinity of the one or more visual displays 160, the program code an also determine that the objectionable object is no longer within the vicinity and can automatically terminate the security action to enable the computing device or devices 180 controlling the one or more visual displays 160 to resume regular operations. The data reception and preprocessing engine 140 continuously obtains data from the sensor devices 170a-170n, to generate images, which are automatically processed by the program code of the neural network engine 130 and based on identifications made by applying the machine-learned model in the neural network engine 130, the decision-making engine 150 can terminate the security actions. Thus, should the neural network engine 130 identify no objectionable entities or positions within images in a time segment after the security action was initiated by the decision-making engine 150, the decision-making engine 150, based on the configuration policies obtained from the configuration engine 120, can terminal the action. When a security action is terminated, the computing device or devices 180 and the one or more visual displays 160 can return to regular operation. Because the data is obtained and processed continuously by the hardware unit 100, security actions and the reversal of these security actions can appear instantaneous to a user. For example, the program code can obscure data on the one or more visual displays 160 (including with a pop-up warning) when an unauthorized and/or unidentifiable as authorized individual enters the monitored vicinity and can stop the obscuring of the data as soon as this individual exits the monitored vicinity. (The monitored vicinity can be configured in the configuration engine 120 based on the physical layout of the physical space where the one or more visual displays 160 are being utilized, the firmware image of computing entities within the physical space, specifications of the one or more visual displays 160, adjudged level of sensitivity of the data that will be displayed, etc.)

Figure 2:
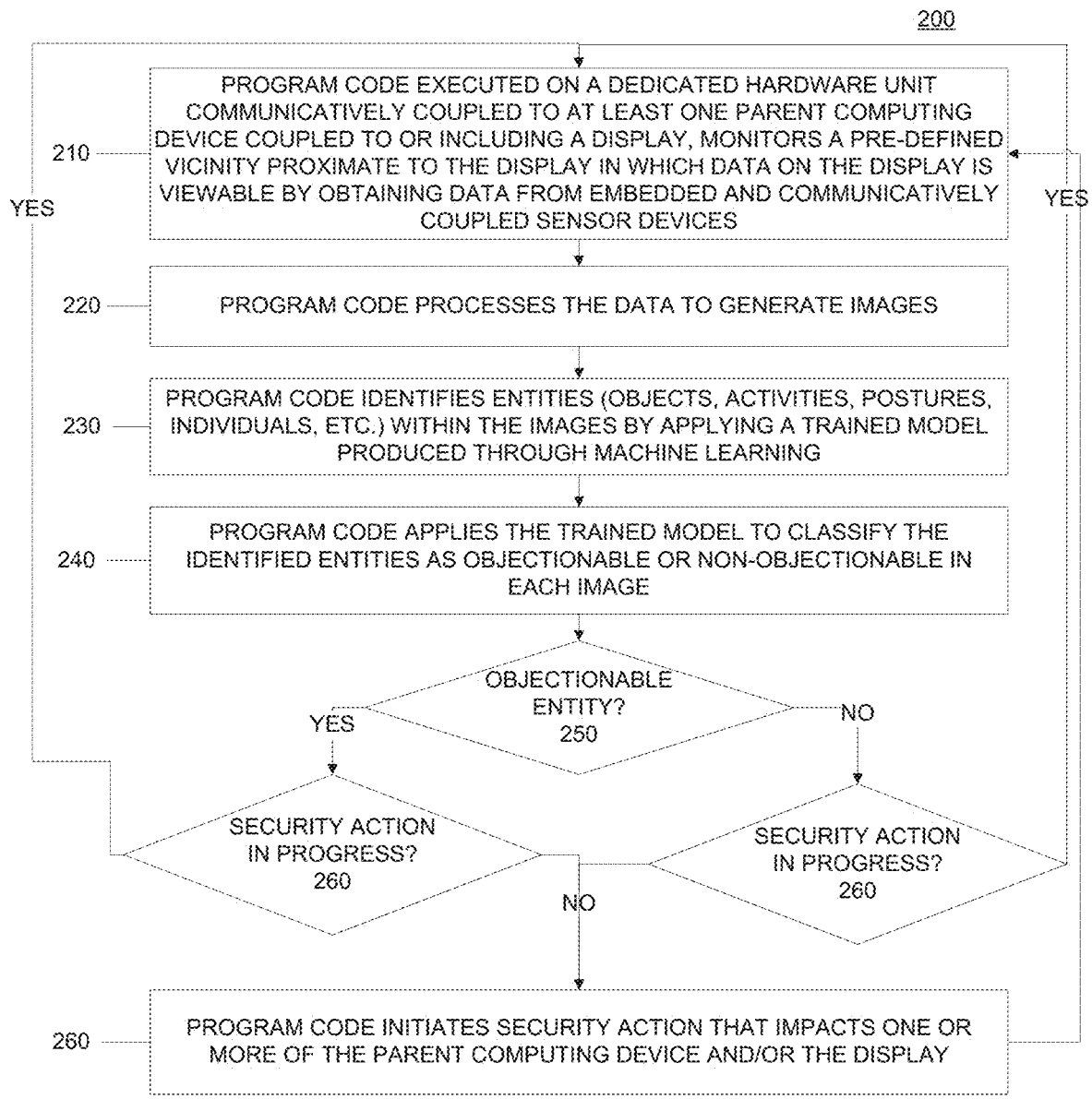
FIG. 2 depicts a workflow that includes various aspects of some embodiments of the present invention.

FIG. 2 is a workflow that includes various aspects of some embodiments of the present invention. Certain of these aspects were previously discussed in reference to FIG. 1 as being performed by separate modules in the hardware unit 110. However, as aforementioned, various embodiments of the present invention can include the functionalities in one or more distinct and/or combined modules. Additionally, the functionality can be integrated into one or more of the hardware and/or software aspects of the hardware unit 110. Thus, in FIG. 2, the workflow 200 aspects are not tied to specific modules.

Referring to FIG. 2, in some embodiments of the present invention, program code executed on a dedicated hardware unit communicatively coupled to at least one parent computing device coupled to or including a display, monitors a pre-defined vicinity proximate to the display in which data on the display is viewable by obtaining data from embedded and communicatively coupled sensor devices (210). These sensors can include, but are not limited to, in-depth cameras, which can enable the program code to detect objects, even in low light conditions, and can also enable the program code to detect distances and dimensions of the objects. The program code processes the data to generate images (220). In some examples, the images are rendered as individual frames and it is these frames in which entities are later identified by the program code. The images can be time stamped and can each represent a given segment of time. The program code identifies entities (objects, activities, postures, individuals, etc.) within the images by applying a trained model produced through machine learning (230). The program code applies the trained model to classify the identified entities as objectionable or non-objectionable in each image (240). Objectionable objects can include but are not limited to, cameras and recording devices (including those embedded in wearable items that a user within the vicinity is wearing). (FIG. 1 discusses how in some examples, the model is trained utilizing machine-learning algorithms to generate the model with the use of neural networks.)

Returning to FIG. 2, the program code continues to monitor the vicinity (210), generate images (220), and apply the model (230), until the program code classifies contents of an image as objectionable (250). Based on classifications of identified objects as objectionable, the program code initiates a security action that impacts one or more of the parent computing device and/or the display (260). In some embodiments of the present invention, the security action initiated can be dependent upon the objectionable object identified. Additionally, the security actions can be configured by the user such that the program code references business rules to determine what security action to initiate. For example, the program code can send a signal to the display hardware that obscures the content displayed on the screen and/or replaces the content with a message (e.g., "Prohibited Objects Detected in the Vicinity").

The program code continuously monitors the vicinity and thus, in some embodiments of the present invention, it clears the initiated security action when the objectionable content that triggered the security action is no longer in the monitored vicinity. As discussed in reference to FIG. 1, if there are no prohibited objects detected by the program code in image frames, the program code can send a signal to the display hardware to resume operation. Referring to FIG. 2, if program code determines that the objectionable objects for which the program code initiated the security action (and/or any other objectionable objects) are no longer within the monitored vicinity, the program code clears the security action such that one or more of the parent computing device and/or the display resume regular operations (270). The clearing action can impact one or more of the parent computing device and/or the display based on the nature of the action that was taken to protect the displayed data.

FIG. 2 depicts an example where when the program code determines that an objectionable entity is in the images (e.g., image frames) (250), based on no security actions already being in progress (260), the program code initiates a security action that impacts one or more of the parent computing device and/or the display (270). In this examples, if the program code determines that a security action is already in progress, no action is taken, although the monitoring, identification, and classification continues (210), (220), (230), (240). Thus, when the program code determines that no objectionable entity is present (250) and a security action is in progress (260), the program code clears the security action such that one or more of the parent computing device and/or the display resume regular operations (280). Likewise, if the program code the program code determines that no objectionable entity is present (250) and no security action is in progress (260), no action is taken, although the monitoring, identification, and classification continues (210), (220), (230), (240). In some embodiments of the present invention, if an objectionable is present but it is a different objectionable entity than the one for which a pending security action was initiated, the program code can change the security action and/or add another security, based on the configuration of rules.

Figure 3:
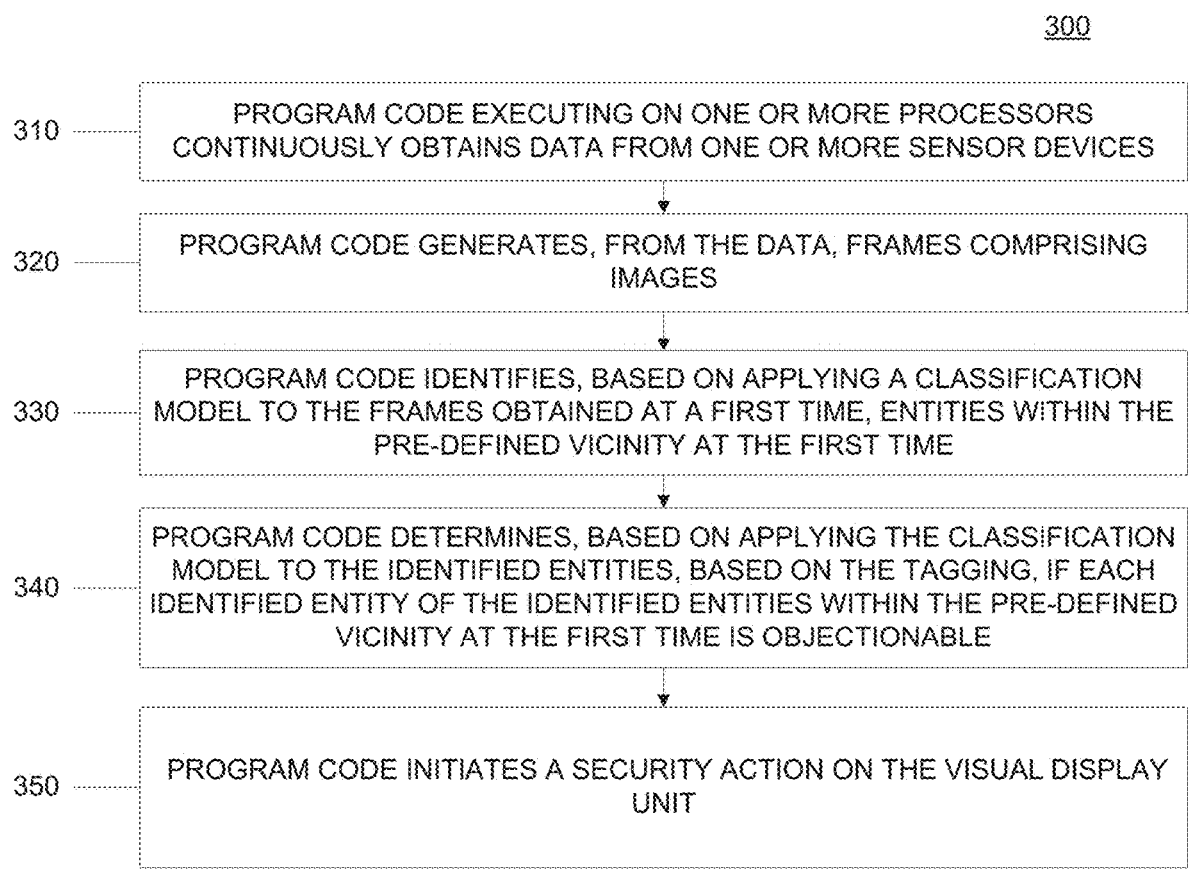
FIG. 3 depicts a workflow that includes various aspects of some embodiments of the present invention.

FIG. 3 is a workflow 300 illustrating various aspect of some embodiments of the present invention. In some embodiments of the present invention, program code executing on one or more processors continuously obtains data from one or more sensor devices (310). These sensor devices monitor a pre-defined vicinity proximate to a visual display unit. The visual display unit is utilized by a computing device to display content. The program code generates, from the data, frames comprising images (320). The program code identifies, based on applying a classification model to the frames obtained at a first time, entities within the pre-defined vicinity at the first time (330). In this example, when the program code identifies these entities, it tags the entities with identifiers and tags positioning of the entities (within the pre-defined vicinity at the first time). The program code determines, based on applying the classification model to the identified entities, based on the tagging, if each identified entity of the identified entities within the pre-defined vicinity at the first time is objectionable (340). Based on determining that at least one identified entity is objectionable, the program code initiates a security action on the visual display unit (350). The security action prevents the objectionable identified entity from viewing the content on the visual display unit.

Embodiments of the present invention include a computer-implemented method, a computer program product, and a computer system where program code executing on one or more processors continuously obtains data from one or more sensor devices, where the one or more sensor devices monitor a pre-defined vicinity proximate to a visual display unit, where the visual display unit is utilized by a computing device to display content. The program code generates frames comprising images. The program code identifies, based on applying a classification model to the frames obtained at a first time, entities within the pre-defined vicinity at the first time, where the identifying comprises tagging entities with identifiers and tagging positioning of the entities within the pre-defined vicinity at the first time. The program code determines, based on applying the classification model to the identified entities, based on the tagging, if each identified entity of the identified entities within the pre-defined vicinity at the first time is objectionable. Based on determining that at least one identified entity is objectionable, the program code initiates a security action on the visual display unit, where the security action prevents the objectionable identified entity from viewing the content on the visual display unit.

In some examples, the program code generates the classification model by training a machine leaning algorithm, to identify the entities and to determine if the entities are objectionable, utilizing a set of the training data, where the set of training data comprises images of entities authorized to view the content and unauthorized positions of entities within the pre-defined vicinity. The program code generates, based on the training of the machine leaning algorithm, the trained classification model.

In some examples, entities are selected from the group consisting of: individuals, objects, movements of individuals, and movements of objects.

In some examples, the one or more sensor devices are selected from the group consisting of: digital cameras, InDepth cameras, light detecting and ranging sensors, and infrared sensors, etc.

In some examples, the program code identifies, based on applying the classification model to the frames generated from data obtained at a second time, where the second time is after the first time, entities within the pre-defined vicinity at the second time, where the identifying comprises tagging entities with identifiers and tagging positioning of the entities within the pre-defined vicinity at the second time. The program code determines, based on applying the classification model to the identified entities within the pre-defined vicinity at the second time, based on the tagging, if an entity within the pre-defined vicinity at the second times is objectionable. Based on determining that no identified entity within the pre-defined vicinity at the second time is objectionable, the program code terminates the security action.

In some examples, the security action is selected from the group consisting of: turning off the visual display unit, locking the visual display unit, obscuring the content, and populating a warning message blocking the content.

In some examples, the program code logs audit information from the computing device from actions initiated at the first time and at time periods proximate to the first time.

In some examples, the program code initiating the security action comprises selecting the security action based on configured business stored in a computing device comprising the one or more processors.

In some examples, the program code identifying the entities within the pre-defined vicinity at the first time comprises utilizing a neural network.

In some examples, the program code determining if each identified entity within the pre-defined vicinity at the first time is objectionable comprises utilizing a neural network.

In some examples, the generated frames comprise image data and image metadata, where the image metadata comprises a distance of each entity in each frame from the visual display unit.

In some examples, a portion of the one or more sensor devices are embedded in the computing device or the visual display unit.

In some examples, a portion of the one or more sensor devices are embedded in a hardware unit comprising the one or more processors.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more of the technical environment, including but not limited to, the hardware unit 110, the configuration engine 120, the neural network engine 120, the neural network referenced in FIG. 1, the decision-making engine 150, the reception and pre-processing engine, the computing device 180, can each comprise a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
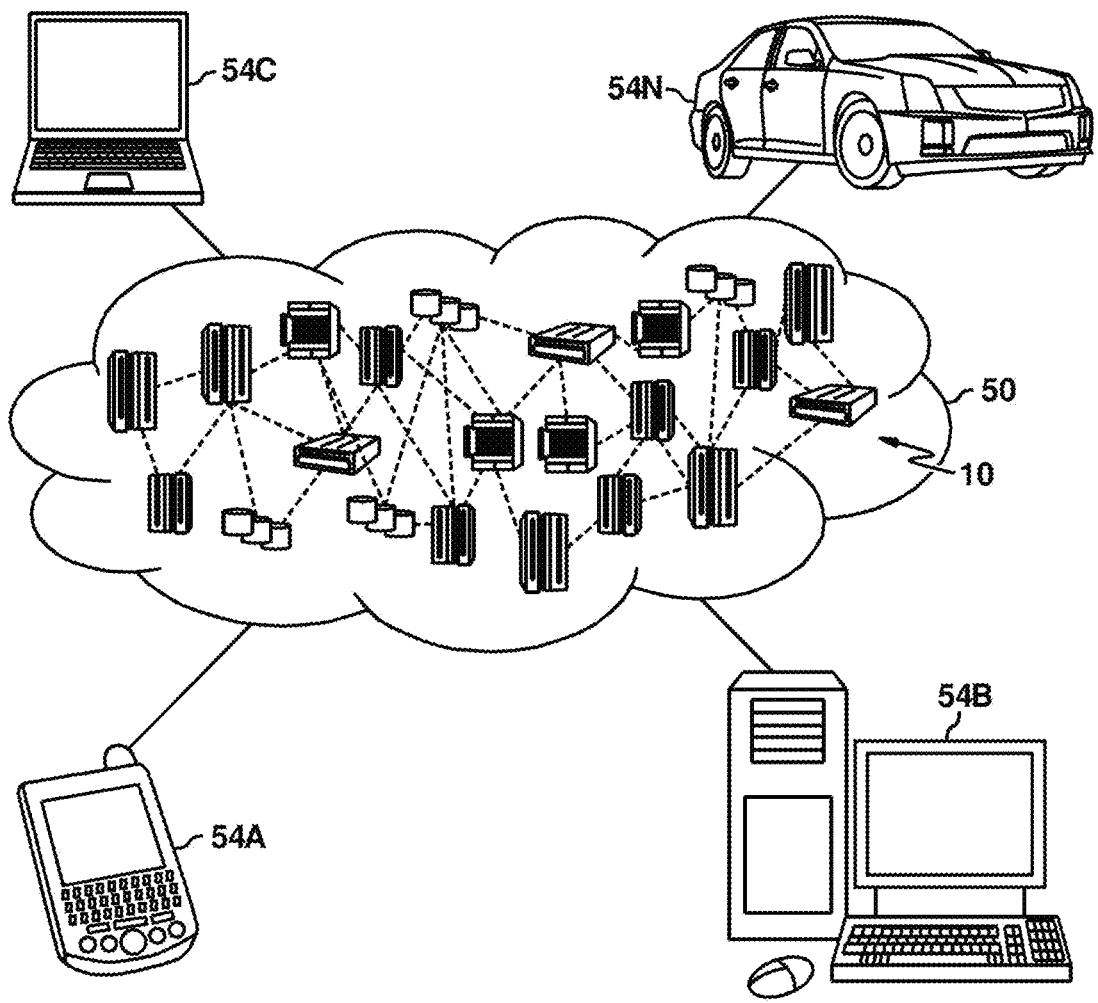
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
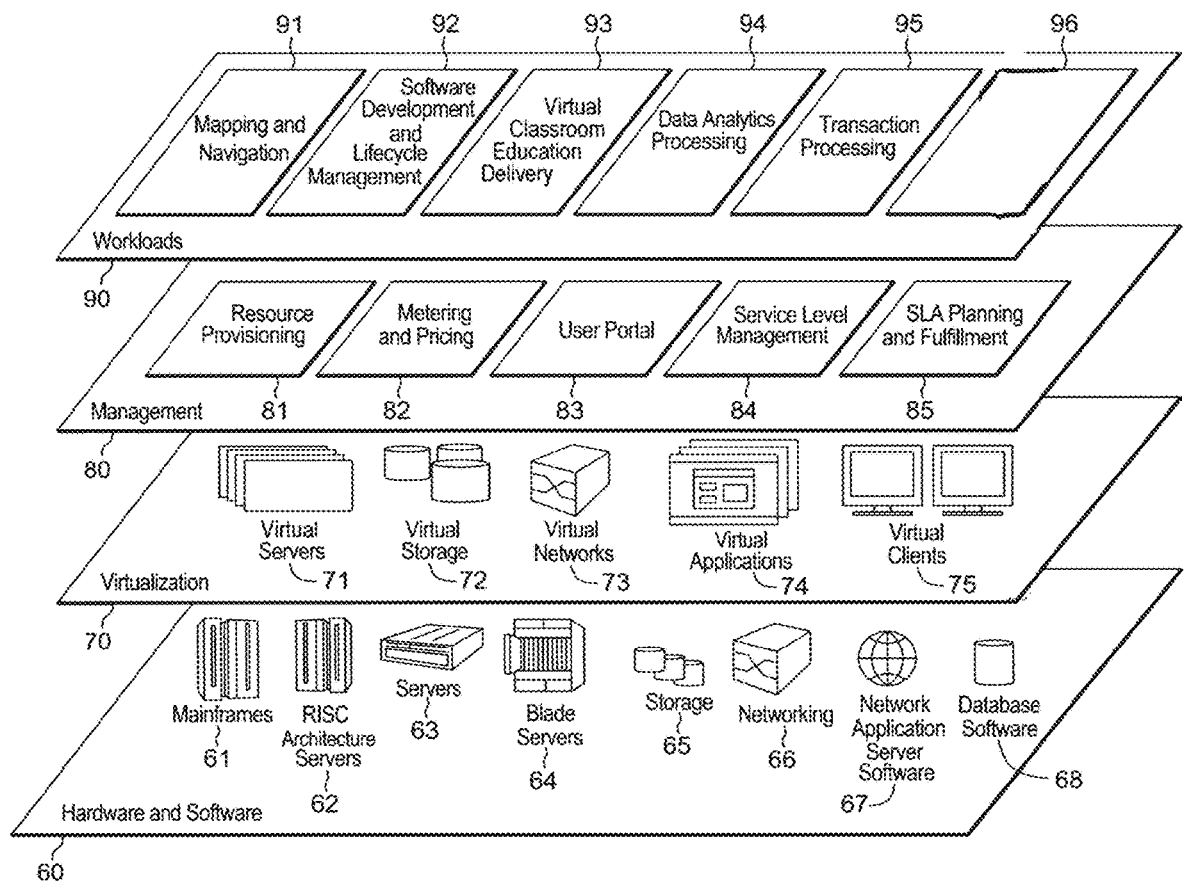
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Workloads can also include virtual examination centers or online examinations (not pictured).

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting an unauthorized presence in a physical space and initiating protective action to prevent the unauthorized presence from viewing or otherwise accessing data viewable by entities in the physical space 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   continuously obtaining, by one or more processors, data from one or more sensor devices, wherein the one or more sensor devices monitor a pre-defined vicinity proximate to a visual display unit, wherein the visual display unit is utilized by a computing device to display content;
   generating, by the one or more processors, from the data, frames comprising images;
   identifying, by the one or more processors, based on applying a classification model to the frames obtained at a first time, a plurality of entities within the pre-defined vicinity at the first time, wherein the identifying comprises tagging the plurality of entities with identifiers and tagging positioning and a posture of the plurality of entities within the pre-defined vicinity at the first time, wherein a first entity of the plurality of entities is a primary user and a second entity of the plurality of entities is an external recording device;
   determining, by the one or more processors, based on applying the classification model to the identified plurality of entities, based on the tagging, if each identified entity of the identified plurality of entities within the pre-defined vicinity at the first time is objectionable; and
   based on determining that the second entity of the plurality of entities is objectionable, initiating, by the one or more processors, a security action on the visual display unit, wherein the security action prevents the second entity of the plurality of entities from viewing and recording the content on the visual display unit.

2. The computer-implemented method of claim 1, further comprising:
   generating, by the one or more processors, the classification model, wherein the generating comprises:
   training, by the one or more processors, a machine leaning algorithm, to identify the plurality of entities and to determine if at least one of the plurality of entities are objectionable, utilizing a set of the training data, wherein the set of training data comprises images of entities authorized to view the content and unauthorized positions of entities within the pre-defined vicinity; and
   generating, by the one or more processors, based on the training of the machine leaning algorithm, the trained classification model.

3. The computer-implemented method of claim 1, wherein the plurality of entities further comprise one or more additional individuals and; and
   wherein the pre-defined vicinity comprises an area surrounding the visual display unit from which data displayed on the visual display unit can be viewed by an individual.

4. The computer-implemented method of claim 1, wherein the one or more sensor devices comprise one or more digital cameras.

5. The computer-implemented method of claim 1, the method further comprising:
   identifying, by the one or more processors, based on applying the classification model to the frames generated from data obtained at a second time, wherein the second time is after the first time, the plurality of entities within the pre-defined vicinity at the second time, wherein the identifying comprises tagging the plurality of entities with identifiers and tagging positioning and the posture of the plurality of entities within the pre-defined vicinity at the second time;
   determining, by the one or more processors, based on applying the classification model to the identified plurality of entities within the pre-defined vicinity at the second time, based on the tagging, if an entity within the pre-defined vicinity at the second times is objectionable; and
   based on determining that no identified entity within the pre-defined vicinity at the second time is objectionable, terminating, by the one or more processors, the security action.

6. The computer-implemented method of claim 1, wherein the security action is selected from the group consisting of: turning off the visual display unit, locking the visual display unit, obscuring the content, and populating a warning message blocking the content.

7. The computer-implemented method of claim 1, further comprising: logging, by the one or more processors, audit information from the computing device from actions initiated at the first time and at time periods proximate to the first time.

8. The computer-implemented method of claim 1, wherein initiating the security action comprises selecting the security action based on configured business stored in a computing device comprising the one or more processors.

9. The computer-implemented method of claim 1, wherein identifying the plurality of entities within the pre-defined vicinity at the first time comprises utilizing a neural network.

10. The computer-implemented method of claim 1, wherein determining if each identified entity within the pre-defined vicinity at the first time is objectionable comprises utilizing a neural network based on at least one of a movement and the posture of each identified entity.

11. The computer-implemented method of claim 1, wherein the generated frames comprise image data and image metadata, wherein the image metadata comprises a distance of each entity in each frame from the visual display unit.

12. The computer-implemented method of claim 1, wherein a portion of the one or more sensor devices are embedded in the computing device or the visual display unit.

13. The computer-implemented method of claim 1, wherein a portion of the one or more sensor devices are embedded in a hardware unit comprising the one or more processors, and wherein the external recording device is embedded in a wearable item that a user within the pre-defined vicinity is wearing.

14. A computer program product comprising:
a computer readable storage medium readable by one or more processors of a shared computing environment comprising a computing system and storing instructions for execution by the one or more processors for performing a method comprising:
continuously obtaining, by the one or more processors, data from one or more sensor devices, wherein the one or more sensor devices monitor a pre-defined vicinity proximate to a visual display unit, wherein the visual display unit is utilized by a computing device to display content;
generating, by the one or more processors, from the data, frames comprising images;
identifying, by the one or more processors, based on applying a classification model to the frames obtained at a first time, a plurality of entities within the pre-defined vicinity at the first time, wherein the identifying comprises tagging the plurality of entities with identifiers and tagging positioning and a posture of the plurality of entities within the pre-defined vicinity at the first time, wherein a first entity of the plurality of entities is a primary user and a second entity of the plurality of entities is an external recording device;
determining, by the one or more processors, based on applying the classification model to the identified plurality of entities, based on the tagging, if each identified entity of the identified plurality of entities within the pre-defined vicinity at the first time is objectionable; and
based on determining that the second entity of the plurality of entities is objectionable, initiating, by the one or more processors, a security action on the visual display unit, wherein the security action prevents the second entity of the plurality of entities from viewing and recording the content on the visual display unit.

15. The computer program product of claim 14, the method further comprising:
identifying, by the one or more processors, based on applying the classification model to the frames generated from data obtained at a second time, wherein the second time is after the first time, the plurality of entities within the pre-defined vicinity at the second time, wherein the identifying comprises tagging the plurality of entities with identifiers and tagging positioning and the posture of the plurality of entities within the pre-defined vicinity at the second time;
determining, by the one or more processors, based on applying the classification model to the identified plurality of entities within the pre-defined vicinity at the second time, based on the tagging, if an entity within the pre-defined vicinity at the second times is objectionable; and
based on determining that no identified entity within the pre-defined vicinity at the second time is objectionable, terminating, by the one or more processors, the security action.

16. A computer system comprising:
one or more sensor devices communicatively coupled to a dedicated hardware unit;
a visual display unit utilized by a computing device, the computing device communicatively coupled to the dedicated hardware unit; and
the dedicated hardware unit comprising:
a memory;
one or more processors in communication with the memory;
program instructions executable by the one or more processors to perform a method, the method comprising:
continuously obtaining, by the one or more processors, data from the one or more sensor devices, wherein the one or more sensor devices monitor a pre-defined vicinity proximate to the visual display unit, wherein the visual display unit is utilized by the computing device to display content;
generating, by the one or more processors, from the data, frames comprising images;
identifying, by the one or more processors, based on applying a classification model to the frames obtained at a first time, a plurality of entities within the pre-defined vicinity at the first time, wherein the identifying comprises tagging the plurality of entities with identifiers and tagging positioning and a posture of the plurality of entities within the pre-defined vicinity at the first time, wherein a first entity of the plurality of entities is a primary user and a second entity of the plurality of entities is an external recording device;
determining, by the one or more processors, based on applying the classification model to the identified plurality of entities, based on the tagging, if each identified entity of the identified plurality of entities within the pre-defined vicinity at the first time is objectionable; and
based on determining that the second entity of the plurality of entities is objectionable, initiating, by the one or more processors, a security action on the visual display unit, wherein the security action prevents the second entity of the plurality of entities from viewing and recording the content on the visual display unit.

17. The computer system of claim 16, the method further comprising:
generating, by the one or more processors, the classification model, wherein the generating comprises:
training, by the one or more processors, a machine leaning algorithm, to identify the plurality of entities and to determine if at least one of the plurality of entities are objectionable, utilizing a set of the training data, wherein the set of training data comprises images of entities authorized to view the content and unauthorized positions of entities within the pre-defined vicinity; and generating, by the one or more processors, based on the training of the machine leaning algorithm, the trained classification model.

18. The computer system of claim 16, wherein the plurality of entities are selected from the group consisting of: individuals, objects, movements of individuals, and movements of objects.

19. The computer system of claim 16, wherein the one or more sensor devices are selected from the group consisting of: digital cameras, InDepth cameras, light detecting and ranging sensors, and infrared sensors, etc.

20. The computer system of claim 16, the method further comprising:

identifying, by the one or more processors, based on applying the classification model to the frames generated from data obtained at a second time, wherein the second time is after the first time, the plurality of entities within the pre-defined vicinity at the second time, wherein the identifying comprises tagging the plurality of entities with identifiers and tagging positioning and the posture of the plurality of entities within the pre-defined vicinity at the second time;

determining, by the one or more processors, based on applying the classification model to the identified plurality of entities within the pre-defined vicinity at the second time, based on the tagging, if an entity within the pre-defined vicinity at the second times is objectionable; and based on determining that no identified entity within the pre-defined vicinity at the second time is objectionable, terminating, by the one or more processors, the security action.

\* \* \* \* \*